United States Patent
Rolleri, Jr.

(10) Patent No.: US 7,314,524 B1
(45) Date of Patent: Jan. 1, 2008

(54) TIRE CLEANING SHIELD

(76) Inventor: Andrew J. Rolleri, Jr., 9 Howard Pl., Melville, NY (US) 11747

( * ) Notice: Subject to any disclaimer, the term of this patent is extended or adjusted under 35 U.S.C. 154(b) by 95 days.

(21) Appl. No.: 11/261,795

(22) Filed: Oct. 31, 2005

(51) Int. Cl.
*B05C 21/00* (2006.01)

(52) U.S. Cl. ............... 118/504; 118/505; 118/301; 280/288.4; 301/37.103; 301/37.104

(58) Field of Classification Search ......... 118/504, 118/505, 301; 427/282; 280/288.4; 301/37.103, 301/37.104; 294/131; 428/66.6, 66.7, 137, 428/138
See application file for complete search history.

(56) References Cited

U.S. PATENT DOCUMENTS

| | | | |
|---|---|---|---|
| 4,288,704 A | * | 9/1981 | Bosard ............... 290/55 |
| 4,628,858 A | * | 12/1986 | King et al. ............. 118/504 |
| 5,044,649 A | * | 9/1991 | Sampson, IV ........... 280/288.4 |
| 6,203,066 B1 | | 3/2001 | Lewis |
| 6,276,406 B1 | | 8/2001 | Mathieu |
| 6,585,329 B2 | | 7/2003 | Crump |
| D486,438 S | | 2/2004 | Tuck et al. |
| 6,692,085 B1 | | 2/2004 | Threadgill |
| 2003/0141150 A1 | | 7/2003 | Bemis |
| 2003/0201666 A1 | | 10/2003 | Artosa et al. |

FOREIGN PATENT DOCUMENTS

JP 58-123928 * 7/1983

* cited by examiner

*Primary Examiner*—Laura Edwards

(57) ABSTRACT

A tire cleaning shield for protecting areas of a vehicle adjacent to a tire includes a panel that has a bottom edge, a top edge, a first lateral edge, a second lateral edge, a first side and a second side. The panel has an opening therein extending into the first side and outwardly of the second side. The opening has a generally same diameter as a diameter of the tire. A drip pan has a front edge, a back edge, and a pair of side edges. The front edge is hingedly coupled to the bottom edge of the panel. The tire is centered in the opening so areas adjacent to the tire are shielded when the tire is sprayed with cleaning chemicals.

8 Claims, 4 Drawing Sheets

TIRE CLEANING SHIELD

BACKGROUND OF THE INVENTION

1. Field of the Invention

The present invention relates to vehicle and hub protecting devices and more particularly pertains to a new vehicle and hub protecting device for protecting the areas around and adjacent to a tire when the tire is being cleaned or sprayed with cleaning chemicals.

2. Description of the Prior Art

The use of vehicle and hub protecting devices is known in the prior art. U.S. Pat. No. 6,692,085 describes a device for attaching to a rim or hub of a tire to protect the rim from chemicals being sprayed onto the tire. Another type of vehicle protecting device is U.S. Pat. No. 6,203,066 having a structure configured to be positioned over a tire to prevent over-spray of cleaning fluids onto the fender of the vehicle. Still yet another such device is found in U.S. Pat. No. 6,585,329 that is configured to be mounted to and protect a rim while a tire is being sprayed with a cleaning fluid.

While these devices fulfill their respective, particular objectives and requirements, the need remains for a device that allows a person to protect the areas adjacent to a tire from cleaning fluid. These areas not only include the vehicle itself but also the pavement or driveway on which the tire is positioned. Further the device should also include a rim protecting member to allow a person to protect the rim from cleaning fluid being sprayed on the tire.

SUMMARY OF THE INVENTION

The present invention meets the needs presented above by generally comprising a panel that has a bottom edge, a top edge, a first lateral edge, a second lateral edge, a first side and a second side. The panel has an opening therein extending into the first side and outwardly of the second side. The opening has a generally same diameter as a diameter of the tire. A drip pan has a front edge, a back edge, and a pair of side edges. The front edge is hingedly coupled to the bottom edge of the panel. A tire is centered in the opening so areas adjacent to the tire are shielded when the tire is sprayed with cleaning chemicals.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
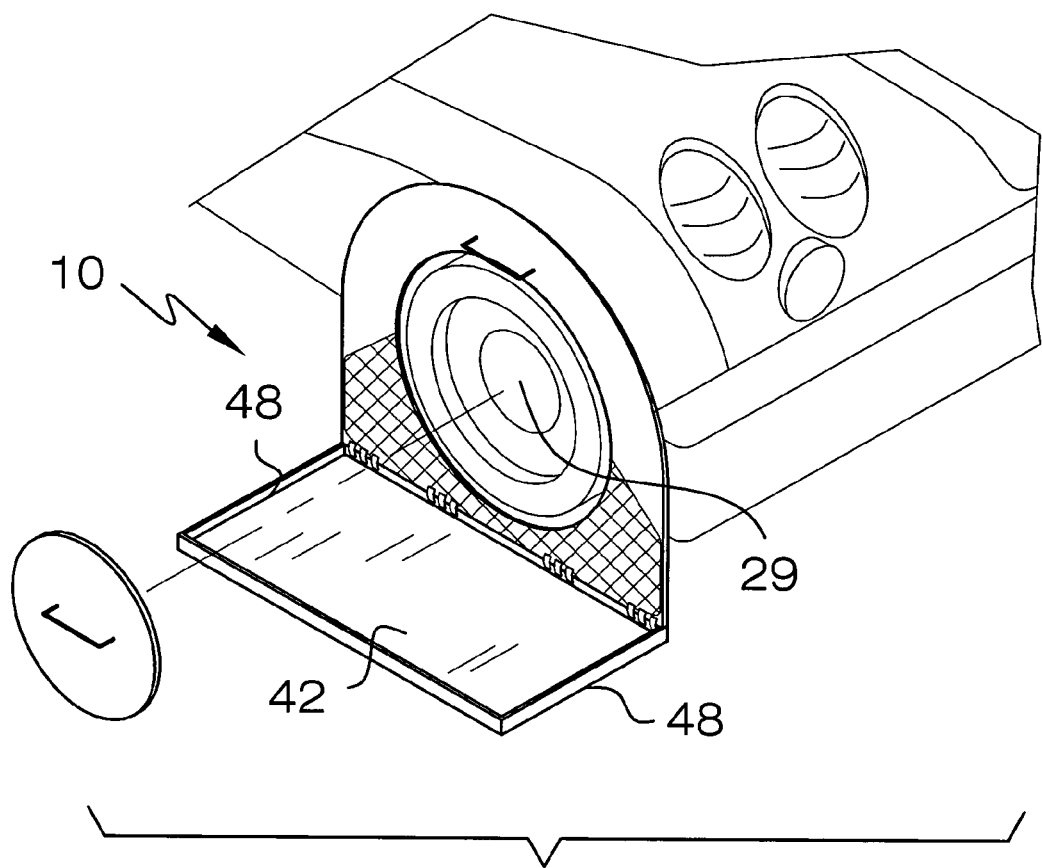
FIG. 1 is a perspective view of a tire cleaning shield according to the present invention.
Figure 2:
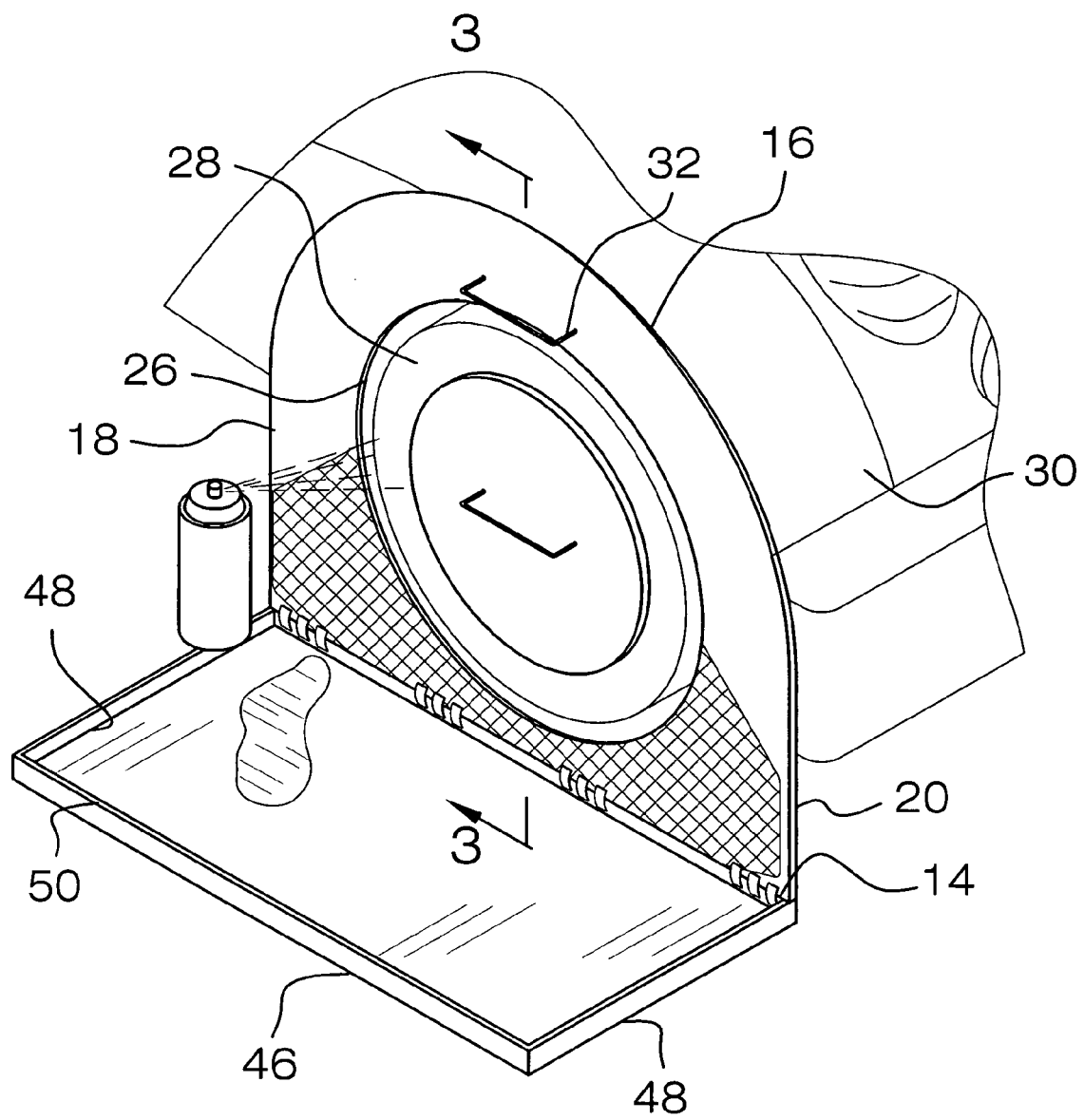
FIG. 2 is a perspective in-use view of the present invention.
Figure 3:
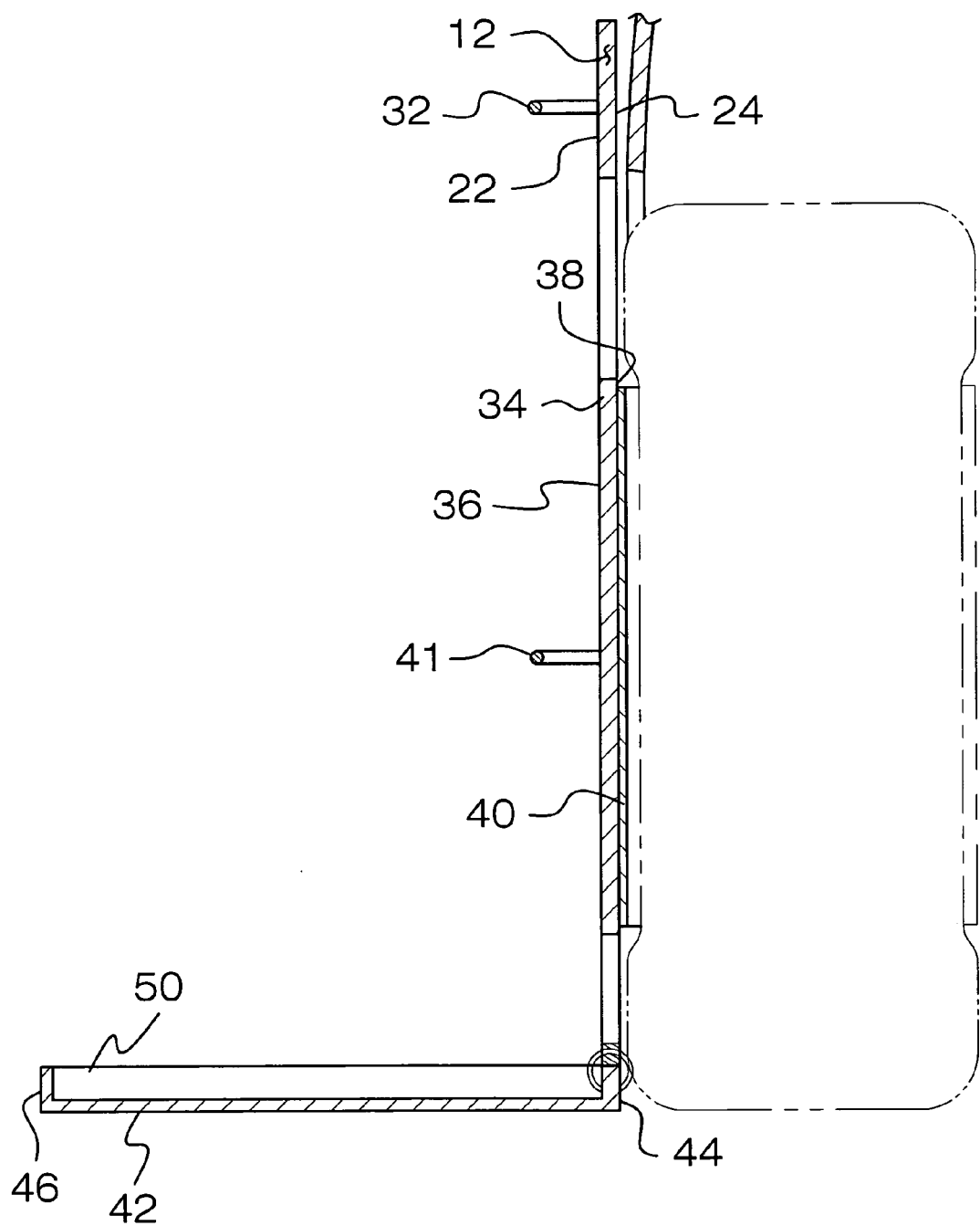
FIG. 3 is a cross-sectional view taken along line 3-3 of FIG. 2 of the present invention.
Figure 4:
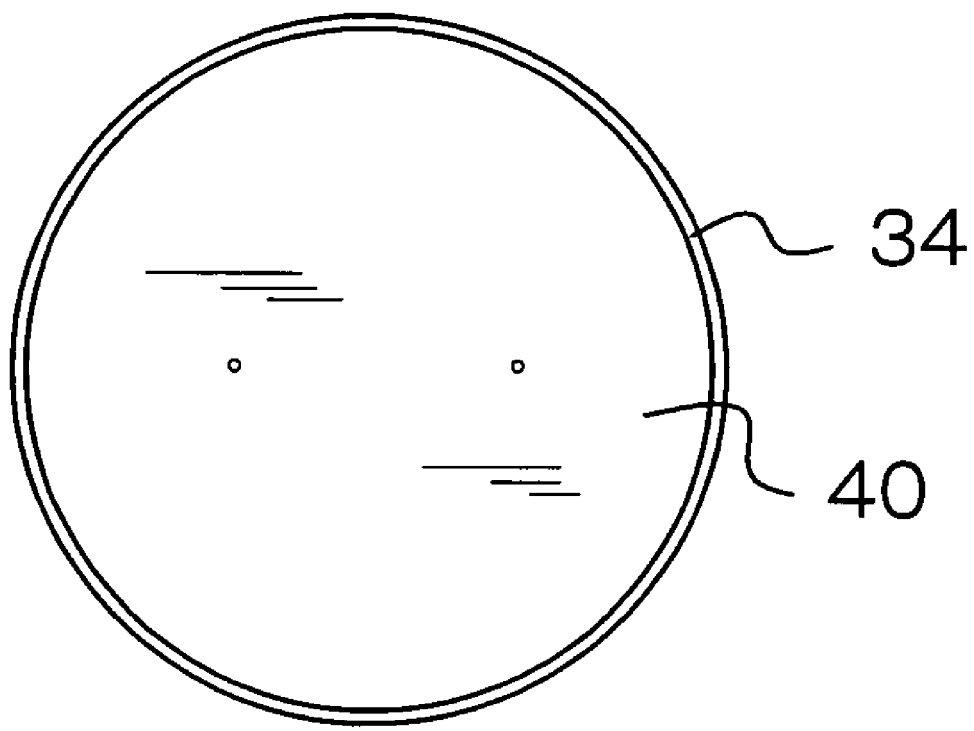
FIG. 4 is a rear view of a rim protecting member of the present invention.

With reference now to the drawings, and in particular to FIGS. 1 through 4 thereof, a new vehicle and hub protecting device embodying the principles and concepts of the present invention and generally designated by the reference numeral 10 will be described.

As best illustrated in FIGS. 1 through 4, the tire cleaning shield 10 generally comprises a panel 12 that has a bottom edge 14, a top edge 16, a first lateral edge 18, a second lateral edge 20, a first side 22 and a second side 24. The panel 12 has an opening 26 therein extending into the first side 22 and outwardly of the second side 24. The opening 26 has a generally same diameter as a diameter of a tire 28 positioned on a vehicle 30. The opening 26 is spaced from the top edge 16. A handle 32 is attached to the first side 22 of panel 12. The handle 32 is positioned between the opening 26 and the top edge 16. The top edge is preferably arcuate.

A plate 34 has a circular shape and that has a first side 36 and a second side 38. The plate 34 has a diameter generally equal to a diameter of a rim 29, or hub, of the tire 28. A resiliently compressible material 40 is attached to and substantially covers the second side 38 of the plate 34. A grip 41 is attached to the first side 36 of the plate 34. The plate 34 defines a rim protecting member.

A drip pan 42 has a front edge 44, a back edge 46, and a pair of side edges 48. A peripheral lip 50 is attached to and extends upwardly from the drip pan 42. The peripheral lip 50 adjacent to the front edge 44 is hingedly coupled to the bottom edge 14 of the panel 12.

In use, the tire 28 is centered in the opening 26 and the plate 34 positioned over the rim 29 or hub so that the rim and areas adjacent to the tire 28 are shielded when the tire 28 is sprayed with cleaning chemicals. Once the tire 28 has been sprayed, the plate 34 and the panel 12 are removed from the tire 28. The drip pan 42 prevents cleaning chemicals from being positioned on the ground adjacent to the tire 28.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shield assembly for positioning around a vehicle's tire to prevent accidental spraying of chemicals onto the vehicle, said assembly comprising:

a panel having a bottom edge, a top edge, a first lateral edge, a second lateral edge, a first side and a second side, said panel having an opening therein extending into said first side and outwardly of said second side, said opening having a generally same diameter as a diameter of the tire;

a drip pan having a front edge, a back edge, and a pair of side edges, said front edge being hingedly coupled to said bottom edge of said panel;

a plate having a circular shape and having a first side and a second side, said plate having a diameter generally equal to a diameter of a rim of the tire, said plate being positionable over the rim of the tire to shield the rim, and wherein the tire is centered in said opening such areas adjacent to the tire are shielded when the tire is sprayed with cleaning chemicals.

2. The assembly according to claim 1, wherein said opening is spaced from said top edge.

3. The assembly according to claim 1, further including a handle being attached to said first side of panel, said handle being positioned between said opening and said top edge.

4. The assembly according to claim 1, further including a resiliently compressible material being attached to and substantially covering said second side of said plate.

5. The assembly according to claim 4, further including a grip being attached to said first side of said plate.

6. The assembly according to claim 1, further including a grip being attached to said first side of said plate.

7. The assembly according to claim 1, further including a peripheral lip being attached to and extending upwardly from said back edge and each of said side edges.

8. A shield assembly for positioning around a vehicle's tire to prevent accidental spraying of chemicals onto the vehicle, said assembly comprising:

a panel having a bottom edge, a top edge, a first lateral edge, a second lateral edge, a first side and a second side, said panel having an opening therein extending into said first side and outwardly of said second side, said opening having a generally same diameter as a diameter of the tire, said opening being spaced from said top edge;

a handle being attached to said first side of panel, said handle being positioned between said opening and said top edge;

a plate having a circular shape and having a first side and a second side, said plate having a diameter generally equal to a diameter of a rim of the tire, a resiliently compressible material being attached to and substantially covering said second side of said plate, a grip being attached to said first side of said plate;

a drip pan having a front edge, a back edge, and a pair of side edges, a peripheral lip being attached to and extending upwardly from said back edge and each of said side edges, said peripheral lip adjacent to said front edge being hingedly coupled to said bottom edge of said panel; and wherein the tire is centered in said opening and said plate positioned over a rim of the tire such that the rim and areas adjacent to the tire are shielded when the tire is sprayed with cleaning chemicals.

* * * * *